Dec. 10, 1968  K. O. KNAUF  3,415,009
ICE CREAM STICK AND WHISTLE
Filed Oct. 13, 1966

INVENTOR
Karl Otto Knauf

BY Bailey, Stephens and Huettig
ATTORNEYS

United States Patent Office 3,415,009
Patented Dec. 10, 1968

3,415,009
ICE CREAM STICK AND WHISTLE
Karl Otto Knauf, Wielandstr. 11,
Lubeck, Germany
Filed Oct. 13, 1966, Ser. No. 586,535
Claims priority, application Germany, Nov. 16, 1965,
K 52,765
5 Claims. (Cl. 46—175)

This invention relates to an ice cream stick and whistle and in particular to an ice cream stick holding a block of ice cream and after the ice cream has been consumed is usable as a whistle.

Ice cream sticks made of synthetic plastic materials for holding a block of ice cream and which has a thin-walled rectangular cross-section are especially suitable for the machine production of ice cream on a stick. Such sticks are hollow and have one or more reinforcing webs connecting the large flat top and bottom of the sticks for forming passageways extending longitudinally through the stick.

The object of this invention is to produce an ice cream stick which, in addition, is usable as another consumer item. This invention begins with an ice cream stick composed of synthetic plastic material and having a flat rectangular cross-section and thin walls. The novelty of this invention is in that a notch is made in a side wall adjacent one end of the stick and penetrates at least one of the passageways. When one end of the stick is held closed and air blown from the other end through the passageways, the stick then becomes a whistle. This does not affect the function of the stick as being an ice cream stick for holding a block of ice cream. The sticks have sufficient structural stability and can be bundled with their large flat surfaces in contact for being inserted into the feeding trays of ice cream machines. The sticks are readily and satisfactorily fed through the ice cream machines.

As conventional, the ice cream stick can have longitudinal ribs, bosses and/or indentations.

The reinforcing webs in the hollow stick form air passageways parallel to the side of the stick and a further feature of this invention is in that the notch penetrates at least two adjacent passageways so that both passageways communicate through the notch to the atmosphere.

A further feature of the invention is in that two notches can be made in the stick which penetrate different passageways. Preferably the notches are made on opposite sides of the stick. In such case, one notch stops short of penetrating a passageway which is entered by another notch.

The means by which the objects of the invention are obtained are described more fully with reference to the accompanying drawings in which.

Figure 1:
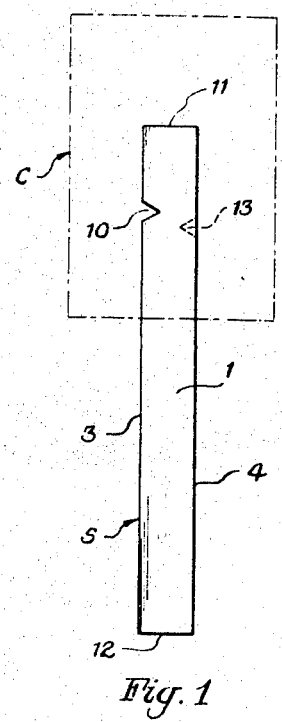
FIGURE 1 is a plan view of the ice cream stick and whistle drawn to approximately actual size.
Figure 3:
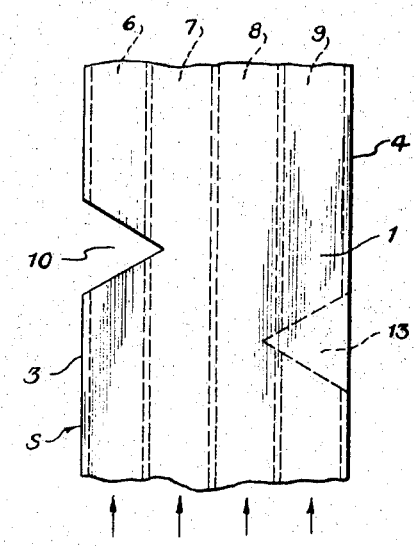
FIGURE 3 is a view of a portion of FIGURE 1 enlarged about five times.
Figure 2:
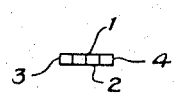
FIGURE 2 is an end view of FIGURE 1.
Figure 4:
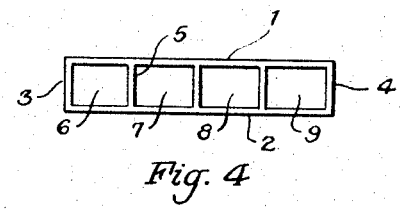
FIGURE 4 is an end view of FIGURE 3.

The ice cream stick S is composed of a synthetic plastic material, such as polypropylene. The stick is hollow and has a top 1, a bottom 2 and sides 3 and 4. The top and bottom are flat and relatively wide as compared to the narrow sides. The stick is rectangular in cross-section. The top and bottom and sides are quite thin. The stick is reinforced by webs 5 connecting the top and bottom and extending longitudinally of the stick parallel to the sides so that several air passageways 6, 7, 8 and 9 are formed which extend entirely through the stick.

A notch 10 is cut in side wall 3 adjacent one end of the stick and extends entirely through pasageway 6 and partially into passageway 7.

After the ice cream block C has been consumed, the stick becomes a whistle when end 11 is held closed and air is blown in end 12. While serving as an ice cream stick the notches are enclosed by the block of ice cream C and thus serve to firmly anchor the block of ice cream to the stick.

In addition, a second notch 13 can be cut in the side 4 as shown by the dashed lines and which notch extends through passageway 9 and partially into passageway 8. When a second notch is used, it does not penetrate into any passageway entered by the other notch. The use of a second notch makes it possible to produce two whistles of different sounds.

Having now described the means by which the objects of the invention are obtained,

I claim:

1. A hollow ice cream stick and whistle comprising a hollow rectangular body having a flat top and a flat bottom, sides joining said top and bottom and open ends, and a first notch extending through one side wall into said body adjacent one end of said body, said notch being enclosed in a block of ice cream when said body is an ice cream stick, and uncovered when said body is a whistle.

2. A stick as in claim 1, said notch being of V-shape and pointed into said body.

3. A stick as in claim 2, further comprising at least one reinforcing web in said body between said top and said bottom and parallel to said sides and forming a plurality of air pasageways through said body, and said notch extending through said web.

4. A stick as in claim 3, further comprising said notch extending entirely through the passageway adjacent the side, and partially through the adjacent passageway.

5. A stick as in claim 4, further comprising a second notch in the side opposite said first notch and extending into a passageway not penetrated by said first notch so that each passageway communicates with a notch not reached by another notch.

References Cited

UNITED STATES PATENTS

| 1,609,791 | 12/1926 | Broadwell | 46—175 |
| 2,126,858 | 8/1938 | Zadek | 46—175 |
| 2,417,480 | 3/1947 | Friedman | 46—179 |

LOUIS G. MANCENE, *Primary Examiner.*

R. F. CUTTING, *Assistant Examiner.*

U.S. Cl. X.R.

46—179